June 23, 1925. 1,542,914
C. V. SHANABERGER
DUMP CAR
Filed March 14, 1925   3 Sheets-Sheet 1

WITNESSES
J. Heleh Bradley

INVENTOR
Carl V. Shanaberger
By Green & McAllister
His Attorneys

June 23, 1925.

C. V. SHANABERGER

DUMP CAR

Filed March 14, 1925   3 Sheets-Sheet 2

1,542,914

INVENTOR
Carl V. Shanaberger
By Green & McCallister
His Attorneys

WITNESSES

June 23, 1925. 1,542,914
C. V. SHANABERGER
DUMP CAR
Filed March 14, 1925    3 Sheets-Sheet 3

WITNESSES
J. Herbert Bradley

INVENTOR
Carl V. Shanaberger
By Green & McCallister
His Attorneys

Patented June 23, 1925.

1,542,914

UNITED STATES PATENT OFFICE.

CARL V. SHANABERGER, OF INDIANA, PENNSYLVANIA, ASSIGNOR TO MINE APPLIANCES COMPANY, A CORPORATION OF DELAWARE.

DUMP CAR.

Application filed March 14, 1925. Serial No. 15,488.

*To all whom it may concern:*

Be it known that I, CARL V. SHANABERGER, a citizen of the United States, and a resident of Indiana, in the county of Indiana and the State of Pennsylvania, have made a new and useful invention in Improvements in Dump Cars, of which the following is a specification.

This invention relates to dump cars and more particularly to cable operated dump cars such as are generally used in hauling a load to the top of an inclined track where the load is dumped.

In many industries such, for example, as the coal mining industry, there is a large amount of waste, such as rocks, slate and the like which must be disposed of, and this is generally accomplished by hauling a load of the waste material in a dump car to the top of an inclined track or roadway where the load is dumped. In order to spread the material over as great an area as possible and to form as broad a dump pile as is practical the cars used must be capable of dumping the load in any desired direction.

The operation of dumping has heretofore been accomplished manually, thus making it necessary to have one or more men at the top of the incline for the purpose of tilting the car to dumping position, with the result that such operation has been comparatively slow and tedious.

An object of this invention is to provide a car of the type set forth which will automatically dump in any desired direction when it is hauled to the point of dumping on the incline.

A further object is to provide a car of this type which is so constructed that the weight of the load carried thereby is used to open the door and tilt the car to dumping position at the desired time.

A still further object is to provide a car of the type set forth which is so constructed that it will automatically right itself after dumping of a load.

A still further object is to provide a cable operated dump car having a simple, automatically operated safety device for preventing movement of the car under the impulse of gravity should the car operating cable break.

A still further object is to provide a car of the type set forth which will be positive in operation, rugged in construction and simple and cheap to manufacture.

Figure 1:
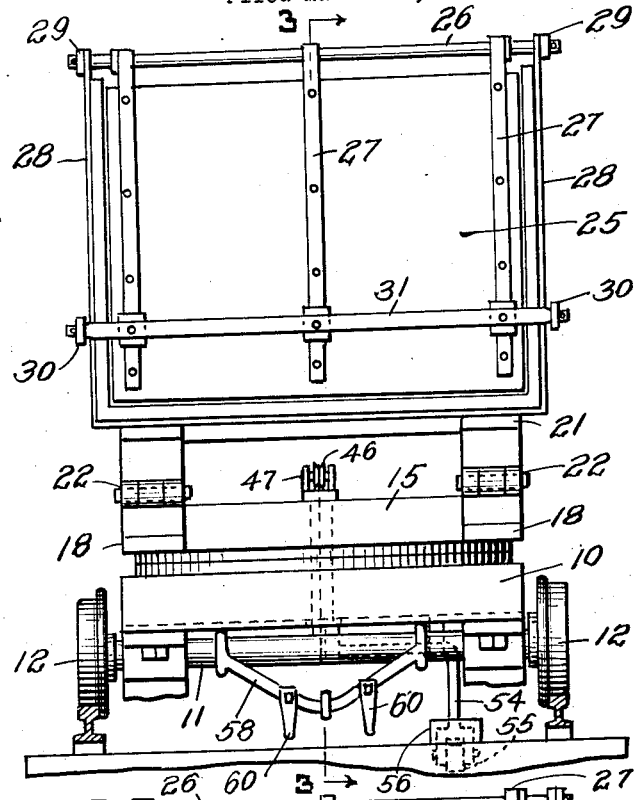
Figure 2:
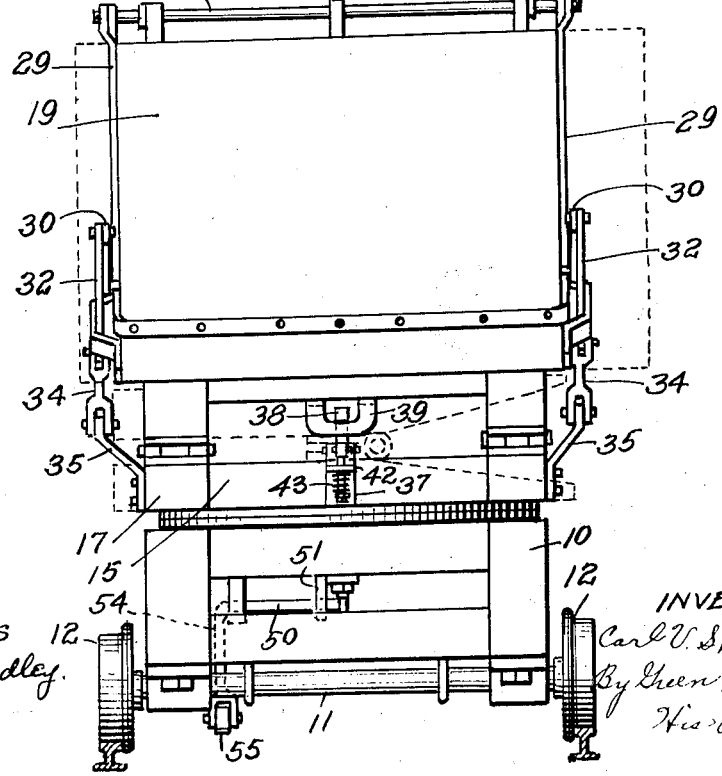
Figure 3:
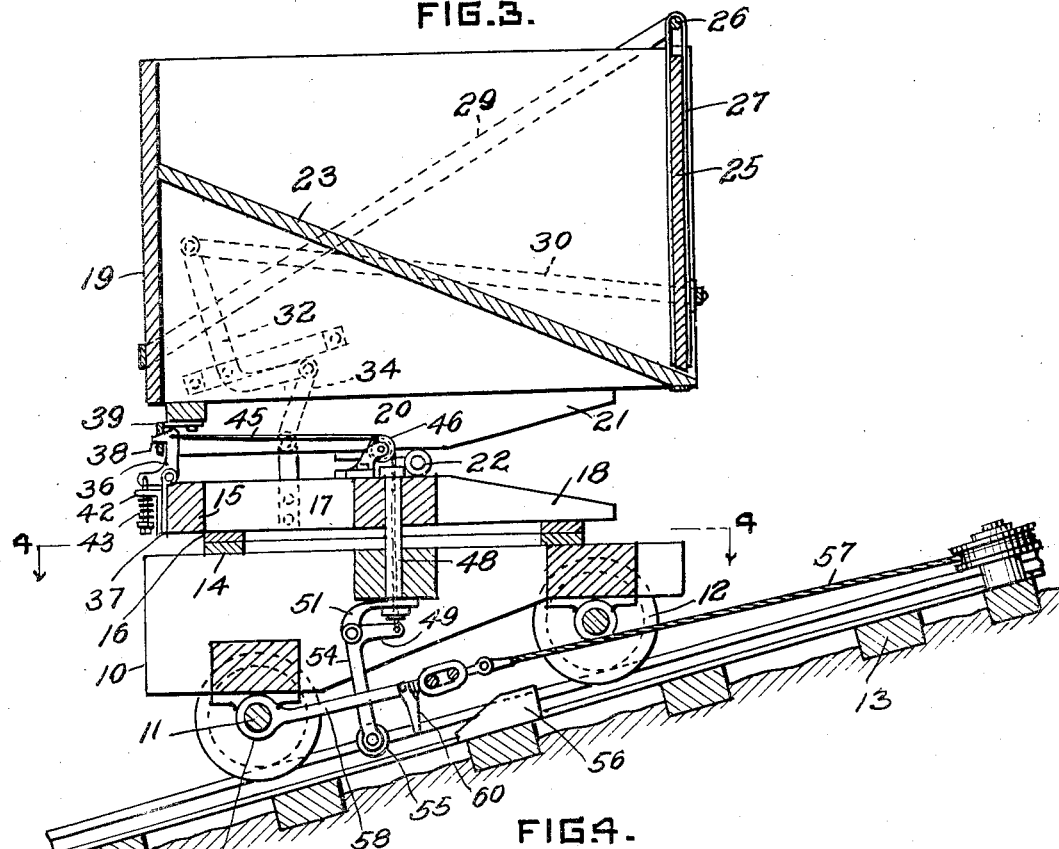
Figure 4:
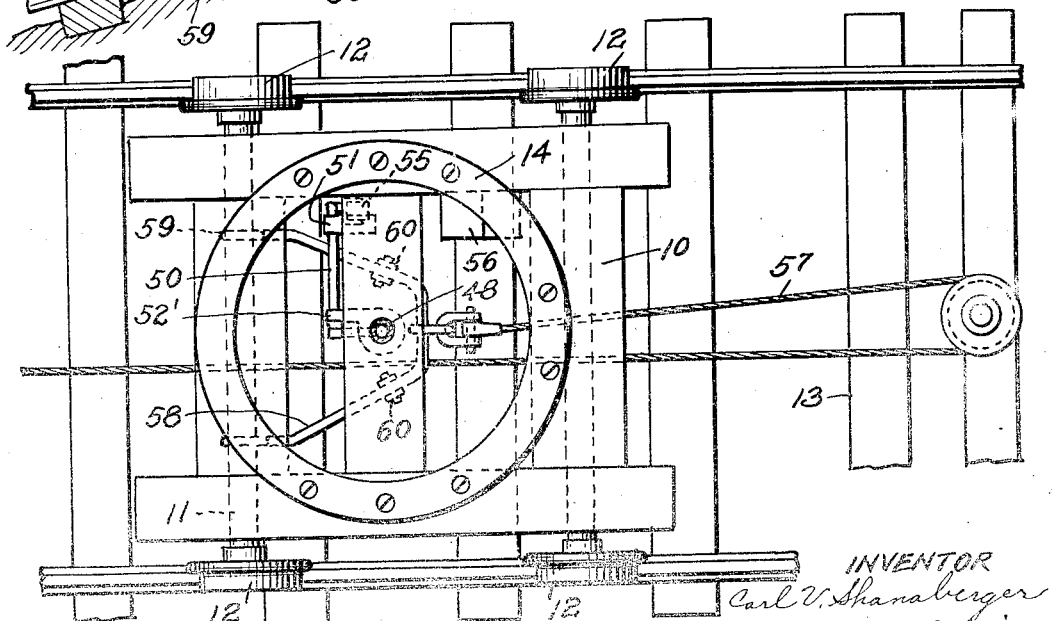
Figure 5:
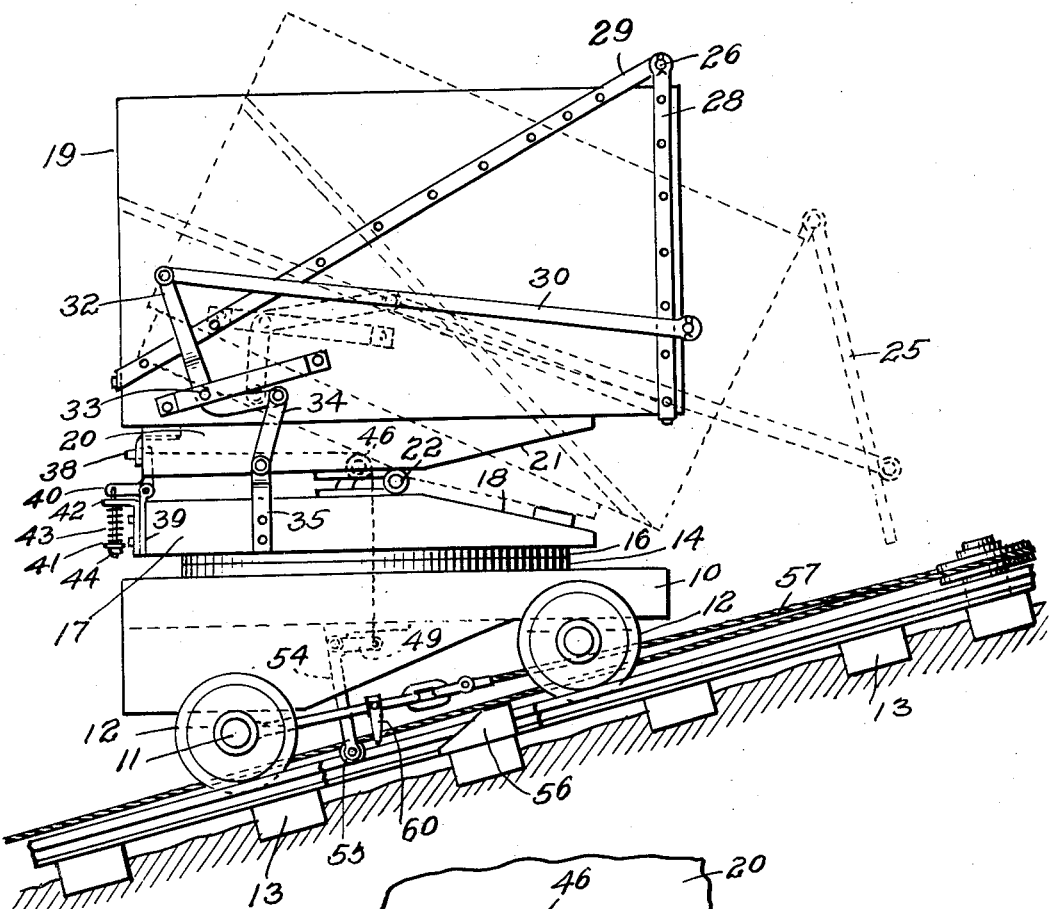
Figure 6:
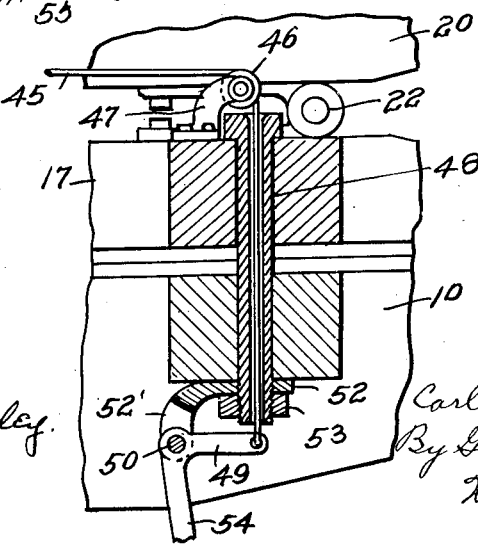

These as well as other objects which will appear obvious to those skilled in this particular art are attained by means of this invention, one embodiment of which is shown for the purposes of illustration in the accompanying drawings, in which Figure 1 is a front elevation of a dump car embodying one form of this invention. Fig. 2 is a rear elevation of the dump car shown in Fig. 1. Fig. 3 is a vertical longitudinal section through the car body on the line 3—3 of Fig. 1. Fig. 4 is a top plan view of the underframe taken on the line 4—4 of Fig. 3. Fig. 5 is a view in side elevation showing in dotted lines the car body tilted to dumping position and Fig. 6 is a detail view on an enlarged scale of certain of the elements shown in Fig. 3.

The particular embodiment of this invention which has been chosen for the purposes of illustration includes an underframe which, in this instance, is adapted to be hauled up an inclined track or roadway by a cable which is generally operated from a suitable engine at the foot of the incline. A turntable is rotatably mounted upon the underframe, and a tilting dump body is hinged to the turntable so that it is rotatable therewith to face in any desired direction, and it is tiltable thereon for dumping. As shown, the body is locked to the turntable against tilting and means are provided for automatically releasing the body so that it will be tilted to dumping position by the weight of the load when the car reaches the desired point on the incline. The point at which the body is hinged to the turntable is so located that the weight of the body will return it to upright position immediately after the load has been dumped. The connecting means for securing the cable to the car is of such construction that should the cable break the connecting means will drop and engage the roadway so as to prevent movement of the car and stop its rolling down the incline under the impulse of gravity.

The particular dump car which is illustrated in the drawings, includes an underframe 10 supported upon axles 11 having wheels 12 for rolling along an inclined roadway or track 13. The underframe has a circular bearing face 14 on the top thereof and a turntable 15 is super-imposed upon the underframe and is provided with a circular bearing plate 16 which cooperates with the bearing plate 14 so as to render the turntable rotatable upon the underframe. The turntable has longitudinally extending side members 17 provided with beveled forward ends 18.

A tilting car body 19 is provided with corresponding longitudinally extending support members 20 having beveled forward ends 21 and which are super-imposed over the longitudinal members 17 of the turntable. A hinge 22 connects each longitudinal member 20 on the car body with the associated turntable member 17, and these hinges 22 permit the car body to be tilted relatively to the underframe and turntable so as to dump the load carried thereby. The forward beveled ends 18 and 21 of the longitudinal members permit such a tilting movement of the body. The hinges are so positioned that the center of rotation of the car body 19 lies in a vertical plane which is spaced from a similar plane passing through the center of gravity of the car body when the body is empty, so that after a load has been dumped the weight of the body will act to right the same from dumping to normal position.

At the same time the car body is constructed so that when loaded the weight of the load will tend to tilt the body to dumping position. This is obtained by providing a slanting floor 23, see Fig. 3, which slants from the back of the car downwardly toward the discharge end thereof. This causes the greater part of the load to be carried on that side of the center of rotation toward which the car body tilts when dumping, so that when loaded the center of gravity is shifted from one side of the center of rotation to the other.

The side of the car which tilts downwardly is provided with a door 25 which is hung from a supporting rod 26 by means of straps 27 which embrace the door throughout its entire height and which are hung over the supporting rod 26. The latter is mounted in the projecting ends of straps 28 extending around three sides of the car body. Braces 29 extend diagonally across two sides of the car from the door supporting rod 26 and assist in providing a rugged structure.

The door is automatically opened upon tilting of the dump body by means of links 30 which extend rearwardly from each end of a bar 31 rigidly secured to the door supporting straps 27. A bell crank 32 is pivoted at 33 on each side of the car body and one end of each bell crank is pivoted to an adjacent end of one of the door operating links 30. The other end of each bell crank is pivotally connected to a link 34 whose lower end is pivoted to a bracket 35 one of which is mounted on each side of the turntable 17. Dumping of the car body causes a rotation of the bell crank 32 about its supporting pivot 33, thus moving the door operating link 30 longitudinally so as to swing the door about the supporting bar 26 and open the same, as clearly shown in dotted lines in Fig. 5.

In order to hold the car body upright and prevent dumping of the load until the desired moment the turntable is provided with a latch 36 pivoted to a bracket 37 mounted at the rear of the turn table. The latch has a nose 38 for engaging a catch 39 secured to the bottom rear of the car body. The latch 36 is normally maintained in engagement with the catch 39 by means of an arm 40 formed on the latch member and connected to a rod 41 extending through a perforation formed in an arm 42 on the bracket 37. A spring 43 is interposed between the arm of the bracket and a collar 44 formed on the rod so as to normally maintain the latch in engagement with the catch 39 and lock the body of the car against tilting movement.

A cable 45 is connected to the latch 36 and extends therefrom inwardly over a pulley 46 mounted upon a bracket 47 on the turntable 17. A hollow bushing 48 extends upwardly from the underframe 10 and the turntable is rotatably mounted thereon. The cable 45 extends downwardly through the hollow bushing and is secured to one end of a crank arm 49 rigidly secured to a shaft 50 rotatably supported in brackets 51 secured to the underframe 10. A washer 52 which is clamped against the underframe by a nut 53 which secures the hollow bushing 48 in position, has an arm 52' forming one of the shaft supporting bearings. A second crank arm 54 is secured to the outer end of the shaft 50 and has a roller in the lower end thereof adjacent the roadway. Engagement of the lower end of the crank 54 with an external object such, for example, as the cam block 56 rotates the crank 49 so as to retract the latch 36 from the catch 39 by means of the cable 45. This unlocks the car body from the turntable and permits it to tilt to dumping position under the weight of the load.

The fact that the cable 45 passes through the hollow bushing 48 which is the center of rotation of the turn table and car body provides a structure which can be automatically operated regardlless of the direction in which the car body is facing as rotation of the car body on the underframe merely serves to slightly twist the cable.

This class of cars is ordinarily hauled up the incline by a cable 57 operated from an engine at the foot of the incline. In order to eliminate all danger of the car running away down the incline should the cable break I provide a connecting device for securing the cable to the car which will operate to hold the car against movement should the cable break.

This device consists of a generally U-shaped arm 58, see Figs. 3 and 4, having eyes 59 formed in the end of each arm by means of which it is pivotally mounted upon one of the car axles. Downwardly depending lugs or dogs 60 are provided upon each arm adjacent the point at which the cable is connected. Obviously upon breaking of the cable the arm 58 will swing downwardly under the influence of gravity so that the dogs 60 will catch upon the ties or upon the road bed and prevent movement of the car.

In loading the car at the foot of the incline the body will be in an upright position and the catch 39 will be engaged by the nose of the latch 36 so as to prevent movement of the body from an upright position or so as to lock the body to the turntable to prevent tilting. At this time the turntable and the super-imposed car body are rotated on the underframe so that the car body faces in the direction in which it is desired to dump the material. After loading the body the car is hauled up the incline by the cable. The cam block 56 or similar device has been positioned at the point on the incline at which it is desired to dump and the car is hauled up until the roller 55 on the crank 54 engages the block so as to withdraw the latch 36 from the catch and unlock the body from the turntable.

The slanting floor of the car places the weight of the load to the right of the center of rotation as seen in Fig. 3 so that when the body is unlocked from the turntable it will automatically tilt to dumping position, as shown in dotted lines in Fig. 5. As the body tilts the door 25 is swung open by means of the mechanism described. The weight of the load against the door 25 also tends to open the door and this pressure on the door assists in dumping the body. In other words the arrangement of the door operating links and levers is such that opening of the door dumps the body and the dumping of the body opens the door so that actual tilting of the body to dumping position is accomplished both by the weight of the load being to the right of the center of rotation and also by the pressure of the load against the door of the car. When the load has been dumped the car rights itself, due to the fact that the center of gravity of the empty car is to the left of the center of rotation in Fig. 3, and the spring pressed latch 36 snaps into place so as to again lock the body to the turntable. The car is run down the incline and the operation then repeated. Should the cable break the car is prevented from running away by the dogs 60 on the arm 58 which would drop under the influence of gravity so as to engage the roadway or the ties which support the rails.

While I have described a specific embodiment of this invention it will be obvious that various changes, omissions, additions, and substitutions can be made therein without departing from the spirit of this invention, or the scope of the appended claims.

What I claim as new and desire to secure by Letters Patent is:

1. The combination, with a dump car having an underframe, a tilting body carried on said underframe and capable of being rotated about a vertical axis so as to dump in any desired direction and means for normally locking the body against dumping, of a track upon which said car is adapted to be hauled, and means for releasing said body to permit the same to dump automatically when a predetermined point in the path of travel of the car is reached.

2. The combination, with a dump car having an underframe, a tilting body carried on said underframe and capable of being rotated about a vertical axis so as to dump in any desired direction and means for normally locking the body against dumping, of a track upon which said car is adapted to be hauled, and means associated with said track for releasing said locking means so as to permit said body to automatically tilt to dumping position when a predetermined point in the path of travel of the car is reached.

3. A dump car having in combination, an underframe adapted to be hauled along an inclined track, a normally horizontal tilting body mounted thereon and adapted to face in any desired direction, means for locking said body against dumping and means adapted to be automatically actuated by contact with an external object caused by movement of the car to release said locking means and permit tilting of said body irrespective of the direction in which said body faces.

4. A dump car having in combination an underframe, a tilting body mounted thereon and adapted to face in any desired direction for dumping, means for locking said body against dumping and means adapted to be automatically actuated by contact with an external object caused by movement of the car to release said locking means and permit tilting of said body irrespective of the direction in which said body faces.

5. A dump car having in combination an underframe, a turntable rotatably mounted thereon, a tilting dump body hinged to said turntable and rotatable therewith so as to permit dumping in any desired direction, means for locking said body against dumping and means including a projecting lever adapted to be actuated by contact with an external object caused by movement of the car for automatically releasing said locking means to permit tilting of said body.

6. A dump car having in combination an underframe, a turntable rotatably mounted thereon, a tilting dump body hinged to said turntable and rotatable therewith so as to face in any desired direction, a latch for locking said body against dumping and a lever operatively connected to said latch and adapted to be actuated by contact with an external object caused by movement of said car to release said latch and permit tilting of said body irrespective of the direction in which said body faces.

7. A dump car having in combination an underframe, a turntable rotatably mounted thereon, a tilting dump body hinged to said turntable and rotatable therewith so as to face in any desired direction, means for locking said body to said turntable and means extending through the center of said turntable for releasing said locking means to permit tilting of said body irrespective of the direction in which said body faces.

8. A dump car having in combination an underframe, a turntable rotatably mounted thereon, a tilting dump body hinged to said turntable and rotatable therewith so as to face in any desired direction, said body being adapted to be tilted to a dumping position by its load, a catch on said body, a spring pressed latch for locking said body to said turntable so as to prevent dumping and means extending through the center of said turntable for withdrawing said latch to permit tilting of said body irrespective of the direction in which said body faces.

9. A dump car having in combination an underframe, a turntable rotatably mounted thereon, a tilting dump body hinged to said turntable and rotatable therewith so as to face in any desired direction, a catch on said body, a spring pressed latch adapted to engage said catch for locking said body to said turntable so as to prevent dumping, a cable secured to said latch and extending through the center of said turntable and a lever operatively connected to said cable and adapted to be actuated by contact with an external object for withdrawing said latch to permit tilting of said body irrespective of the direction in which said body faces.

10. A dump car having in combination an underframe, a turntable rotatably mounted thereon, a tilting dump body hinged to said turntable and rotatable therewith so as to face in any desired direction, a catch on said body, a spring pressed latch adapted to engage said catch for locking said body to said turntable so as to prevent dumping, a cable secured to said latch and extending through the center of said turntable, a crank shaft on said underframe provided with an arm to which said cable is secured and a projecting lever on said shaft adapted to be actuated by contact with an external obstruction for withdrawing said latch to permit tilting of said body irrespective of the direction in which said body faces.

In testimony whereof, I have hereunto subscribed my name this 12th day of March, 1925.

CARL V. SHANABERGER.